3,349,466
METHOD OF MANUFACTURING ALUMINUM-CLAD NUCLEAR FUEL ELEMENTS BY HOT-SWAGING IN AIR
Walter Precht, Towson, Raymond J. Geckle, Dundalk, and Louis Frank, Baltimore, Md., assignors to Martin-Marietta Corporation, a corporation of Maryland
No Drawing. Filed May 2, 1960, Ser. No. 25,846
7 Claims. (Cl. 29—420.5)

This application in a continuation-in-part of copending application Ser. No. 696,295, filed Nov. 13, 1957, and now abandoned.

This invention relates to an improved method of manufacturing a fuel element containing fissionable materials for use in nuclear reactors.

When attempting to bond to aluminum at elevated temperatures, it has been the practice heretofore to employ a protective atmosphere or a vacuum so as to prevent undue oxidation of the aluminum tending to inhibit the formation of a sound metallurgical joint. As a result, it has been necessary heretofore to perform the bonding step in a vacuum furnace or a furnace provided with an inert atmosphere. Alternatively, the aluminum-containing member being bonded was enclosed in a protective evacuated sheath.

It has been found that fuel elements having components made of aluminum or aluminum base alloys may be satisfactorily bonded in air, thereby obviating the use of special furnaces or protective coverings and correspondingly reducing the time and expense involved in fabricating such elements.

An object of this invention is to provide a novel method of making an aluminum tubular fuel element for use in nuclear reactors.

Another object of this invention is to provide a novel method of making an aluminum tubular fuel element which has exceptionally long life because of the lack of tendency to form hot spots.

A further object of this invention is to provide a novel method of making an aluminum tubular fuel element which contains an unusually high concentration of fissionable material.

Other objects and advantages of this invention will become apparent from the following description and explanation thereof.

In accordance with the present invention an assembly comprising a hollow tubular core of a mixture containing aluminum particles and particles of an oxide of a fissionable metal is disposed between inner and outer concentric aluminum tubes, the inner tube being disposed on a mandrel. The assembly is hot-swaged in air so as to reduce its cross section and cause the core to bond metallurgically with the inner and outer metal tubes. Swaging is preferably performed at a temperature of about 550° C. to 600° C., in which range the aluminum particles in the core will sinter and coalesce about the oxide particles to form a continuous matrix. When swaging has been completed the mandrel is removed from the inner tube.

Although a tubular fuel element is used throughout to illustrate the present invention it will be appreciated that other shapes such as oval, square, etc., may be used in the same manner.

In the copending application of Tibor F. Nagey, Jack A. Hunter and William A. Maxwell, entitled, "Transportable Nuclear Reactor Power Plant," Ser. No. 7,725, filed Feb. 4, 1960, now U.S. Patent No. 3,086,933, there is disclosed a nuclear reactor which is adapted to incorporate the tubular fuel element which is produced by the methods of the present invention.

When forming the assembly to be bonded the core may be compacted before inserting same between the inner and outer cladding tubes. A powder mixture of aluminum and an oxide of a fissionable metal may be pressed into bushings of suitable diameter, or may be rolled and sintered to form a cermet sheet which is subsequently formed into a tube. In another method of making the core, the inner and outer aluminum tubes which serve to clad the core are assembled so as to define a hollow tubular chamber. One end of the chamber is closed with an aluminum bushing, and the chamber is then filled with the powder mixture of aluminum particles and oxide particles. This subdivided mixture is then subjected to an operation whereby the subdivided mixture is compacted. Compacting of the subdivided mixture can be accomplished by hand tamping the mixture or by using a vibratory packer. The compacting treatment reduces the void space between the subdivided particles of the mixture and hence eliminates a substantial amount of gaseous material which may be included therein. Furthermore, it is desirable to increase the density of the mixture as much as possible in order to expose the greatest possible amount of matrix material to the surfaces of the cladding members. In this way there is a greater tendency to obtain the desired metallurgical bond between the matrix material and the cladding members.

It is preferred to form the core either from pre-compacted bushings or by compacting a powder mixture of aluminum particles and an oxide between the inner and outer aluminum tubes, because larger percentages of oxide material may be incorporated into the core in this manner than by the method wherein the core is first formed into a cermet sheet. The reason is that in the last-mentioned technique, the amount of oxide material which may be included in the cermet sheet is limited to that amount which will permit the sheet to be bent into a tube, whereas no such constraint is imposed upon the fabrication of a core from powder bushings, which are usually pressed up in a die, or from a loose powder compacted in situ. However, the methor of making the core and assembling same together with the inner and outer aluminum tubes prior to bonding is not a part of this invention. This invention is directed, rather, to the bonding step itself, wherein the tubular assembly aforedescribed is simultaneously reduced in cross section and metallurgically joined so as to form an integral fuel element.

The core or "meat" of the fuel element is composed of an aluminum oxide cermet, the oxide being the oxide of a fissionable metal and selected from the group consisting of uranium dioxide, uranosic oxide, thorium dioxide and plutonium dioxide. The oxide may constitute up to 75% by weight of the core, usually from about 50% by weight to about 75%. Of course, an amount of oxide less than 50% by weight may be used, depending upon the enrichment of the fuel and other nuclear requirements.

The fuel element assembly, comprising the hollow tubular core encased between inner and outer aluminum tubes concentric therewith is disposed on a mandrel. In an exemplary case, the inner aluminum tube is drawn down over the mandrel. The outer aluminum tube is then disposed over the inner tube and spaced therefrom at one end by means of an aluminum bushing machined so as to make a snug fit with the inner and outer aluminum tubes. The space between the inner and outer tubes is then filled to a predetermined height with powder mixture of, for example, 65% by weight of particulate uranium dioxide and 35% by weight of aluminum particles. The powder is densified by means of a vibratory packer, and the open end of the assembly is closed with a second aluminum bushing like the first. When the assembly has been so completed, it is heated to the swaging temperature, preferably within the range 550° C. to 600° C. wherein the aluminum particles in the core are caused to sinter. The heated assembly is subsequently swaged to reduce its cross section and further densify the core. During this reduction step the core and the inner and outer aluminum tubes are brought into intimate contact. Generally, the assembly is reduced in cross section by about 30% to 55%. In this operation the internal diameter of the inner aluminum tube is not significantly affected. The effect of hot swaging the aforedescribed fuel element assembly is to bring about a metallurgical bonding of the core to the inner and outer aluminum tubes, a metallurgical bonding of the inner and outer aluminum tubes to the bushings, and a metallurgical bonding of the core to the bushings. There is obtained, then, an integral tubular fuel element.

It is hypothesized that metallurgical bonding of aluminum in air is made possible because the oxide film on the mating surfaces of the assembly is broken during the swaging operation, thereby exposing unoxidized aluminum for bonding. Metallurgical bonding is not obtained when the assembly is hot drawn or extruded. Apparently it is necessary to subject the components to be bonded to sharp blows such as are sustained in the swaging process.

Hot swaging has been particularly successful in the fabrication of small diameter fuel elements, for example, elements having an internal diameter of about 0.2 to 0.75 inch and a core thickness between about 0.015 to 0.1 inch. Dimensions of a specific fuel element before and after hot swaging are given below, together with the heating temperature and time.

|  | Before Working | After Working |
|---|---|---|
| Mandrel O.D., in | 0.195 | 0.195 |
| Inner Al Tube: |  |  |
| I.D., in | 0.195 | 0.195 |
| O.D., in | 0.221 | 0.190 |
| Outer Al Tube: |  |  |
| I.D., in | 0.269 | 0.224 |
| O.D., in | 0.295 | 0.244 |
| Core Thickness, in | 0.024 | 0.017 |
| Heating Temperature, °C | 575 | 575 |
| Heating Time, hr | 1 | 1 |

Having thus provided a written description of the invention and a specific embodiment thereof, it should be understood that no undue restrictions or limitations are to be imposed by reason thereof, but that the present invention is defined by the appended claims.

What is claimed is:

1. In the method of manufacturing a metallurgically bonded aluminum-clad tubular fuel element derived from an assembly comprising a hollow tubular core encased between inner and outer concentric aluminum tubes, said core being derived from a mixture of aluminum particle and particles of an oxide of a fissionable metal selected from the group consisting of uranium dioxide, uranosic oxide, thorium dioxide and plutonium dioxide, said inner tube being disposed on a mandrel, the improvement comprising hot-swaging said assembly in air at a temperature sufficiently high to cause the aluminum particles of said core to bond metallurgically to said inner and outer aluminum tubes.

2. The improvement of claim 1 wherein said temperature is between about 550° C. to 600° C.

3. The improvement of claim 1 wherein said assembly is reduced in cross section by about 30% to 55%.

4. The improvement of claim 1 wherein said core is a cermet.

5. The improvement of claim 1 wherein said core is a compacted powder mixture.

6. The method of making a tubular aluminum fuel element comprising the steps of encasing a hollow tubular core in an aluminum sheath so as to form a hollow tubular aluminum-clad assembly, said core being derived from a mixture of aluminum particles admixed with particles of an oxide selected from the group consisting of uranium dioxide, uranosic oxide, thorium dioxide and plutonium dioxide, disposing said assembly on a mandrel and hot-swaging said assembly at a temperature between about 550° C. to 600° C. so as to reduce the cross-sectional area of said assembly by about 30% to 55%, whereby said core is metallurgically bonded to said sheath.

7. In the method of manufacturing a metallurgically bonded aluminum-clad tubular fuel element by the application of heat and pressure to an assembly comprising a hollow tubular core enclosed in a sheath of aluminum so as to form a hollow tubular assembly, said core being derived frm aluminm particles admixed with particles of an oxide of a fissionable metal selected from the group consisting of uranium dioxide, uranosic oxide, thorium dioxide and plutonium dioxide, said oxide constituting about 50% to 75% of the weight of said core, the improvement comprising disposing said assembly on a mandrel, and hot-swaging said assembly at a temperature of about 550° C. to 600° C. so as to reduce the cross section of said assembly by about 30% to 55% and metallurgically bond said core to said sheath.

References Cited

UNITED STATES PATENTS

| | | | |
|---|---|---|---|
| 2,707,889 | 5/1955 | Sowter | 29—470.1 |
| 2,805,473 | 10/1957 | Handwerk et al. | |
| 2,820,751 | 1/1958 | Saller. | |
| 2,843,539 | 7/1958 | Bornstein. | |
| 2,914,454 | 11/1959 | Gurinsky et al. | |
| 2,983,660 | 5/1961 | Loeb et al. | 176—83 X |
| 2,986,504 | 5/1961 | Goslee et al. | 176—67 X |
| 3,012,951 | 12/1961 | Storchheim | 176—83 |

OTHER REFERENCES

WAPD–PWR–904, Dec. 3, 1956, Belle & Jones, pp. 83–84.

HW–52729, by E. A. Evans, Sept. 18, 1957, Hanford Atomic Products Operation, Richland, Wash., General Electric.

International Conf. on Peaceful Uses of Atomic Energy, 1955, vol. 9, pp. 186, 196–202.

L. DEWAYNE RUTLEDGE, *Primary Examiner.*

WILLIAM WILES, ROGER L. CAMPBELL,
*Examiners.*

V. G. GIOIA, R. L. GOLDBERG, R. L. GRUDZIECKI,
*Assistant Examiners.*